United States Patent [19]
Okuno et al.

[11] 3,978,502
[45] Aug. 31, 1976

[54] VIEW-FINDER DEVICE FOR SINGLE LENS REFLEX CAMERA

[75] Inventors: Youichi Okuno, Yokohama; Hideo Yokota, Tokyo, both of Japan

[73] Assignee: Canon Kabushiki Kaisha, Japan

[22] Filed: Oct. 8, 1974

[21] Appl. No.: 513,137

[30] Foreign Application Priority Data
Oct. 11, 1973  Japan.............................. 48-118211

[52] U.S. Cl. .............................................. 354/225
[51] Int. Cl.² ........................................ G03B 17/20
[58] Field of Search.................... 354/219, 224, 225

[56] References Cited
UNITED STATES PATENTS

| | | |
|---|---|---|
| 3,524,380 | 8/1970 | Youroda et al...................... 354/224 |
| 3,757,656 | 9/1973 | Kuramoto............................ 354/225 |
| 3,800,655 | 4/1974 | Uchida................................ 354/225 |

FOREIGN PATENTS OR APPLICATIONS

| | | | |
|---|---|---|---|
| 1,216,098 | 5/1966 | Germany ............................ 354/224 |
| 1,051,433 | 12/1966 | United Kingdom................. 354/224 |

*Primary Examiner*—Joseph F. Peters, Jr.
*Attorney, Agent, or Firm*—McGlew and Tuttle

[57] ABSTRACT

The finder device forms the images of a plural number of photographing information indication bodies, provided on the exterior of the camera in a row extending in a direction other than parallel to one side edge of the focussing screen of the camera, in the neighborhood of the rectangular image of the focussing screen to extend in a row in a direction parallel to such side edge of the focussing screen and closely adjacent this side.

8 Claims, 11 Drawing Figures

VIEW-FINDER DEVICE FOR SINGLE LENS REFLEX CAMERA

FIELD AND BACKGROUND OF THE INVENTION

The present invention relates to a finder device by means of which images of a plural number of photographing information bodies, provided on the exterior of a single reflex camera to extend in a direction which is not parallel to one side edge of the focussing screen of the camera, are formed to extend in a direction parallel to such one side edge of the image of, are to extend in a direction parallel to the image of the focussing screen and closely adjacent such one side.

A finder device for a single reflex camera, by means of which images of the photographing information bodies, such as aperture value and so on, provided on the exterior of the camera, are formed in the neighborhood of the image of the focussing screen, has widely been known. For example in the U.S. Pat. No. 3,094,911 corresponding to the German Pat. No. 1,211,483 (whose inventor is W. Reiche et al.) there is disclosed a finder device in which, on the non-reflecting surface of a pentagonal prism, a subprism is cemented, by means of which subprism the light beam from the figures for the aperture value, provided on the aperture ring on the lens barrel and that from the shutter time, provided on the shutter ring, are oriented in a direction toward the eye piece in such a manner that the images of the above mentioned figures for the aperture value and for the shutter time are formed in the neighborhood of the image of the focussing screen.

However by, means of the above mentioned finder device, the images of a plural number of the photographing informations, such as aperture value, the shutter time, and so on, are formed to extend in a direction perpendicular to one side (namely the upper side) of the image of the focussing screen.

Further, in the German Pat. No. 1,216,098 (VEB), there is disclosed a finder device in which, on the non-reflecting surface of a pentagonal prism, a subprism and a plane parallel glass are cemented the one over the other, whereby the light beam coming from an indication body situated above the pentagonal roof prism is oriented, by means of the slant planes of the plane parallel glass, in a direction toward the eye piece, while the light beam coming from the lens barrel is directed, by means of the subprism, in a direction toward the eye piece in such a manner that the images of the two indication bodies are formed in the neighborhood of the image of the focussing screen.

However by means of the above mentioned device the images of the two indication bodies are formed to extend in a direction perpendicular to one side (namely the upper side) of the image of the focussing screen.

Thus the above mentioned already known two finder devices present such a shortcoming that it is difficult to observe the images of the indication bodies distant from the one side of the image of the focussing screen.

SUMMARY OF THE INVENTION

The object of the present invention is to provide a finder device by means of which the images of a plural number of the indication bodies, extending in a direction perpendicular to a side of the focussing screen, can be observed well.

The object of the invention can be attained by making the images of a plural number of the indication bodies extending in a direction perpendicular to one side edge of the focussing screen, to be formed, being rearranged, to extend in a direction parallel to and adjacent such one side one side edge of the image of the focussing screen. The above mentioned rearrangement is accomplished by means of an optical means comprising at least a light beam defelecting means.

BRIEF DESCRIPTION OF THE DRAWINGS

The present invention will be explained in detail with reference to the attached drawings.

DESCRIPTION OF THE PREFERRED EMBODIMENTS

Figure 1:
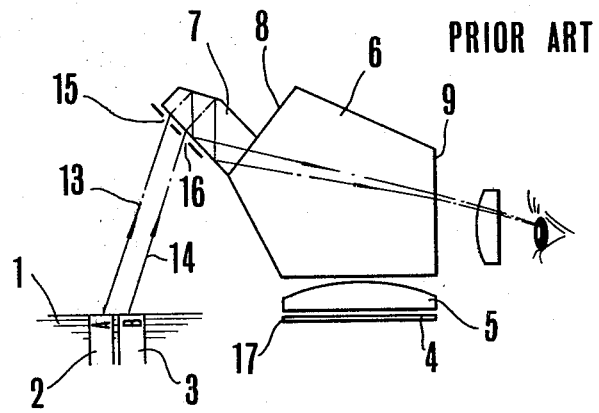
FIG. 1 shows the finder device of the above mentioned U.S. Pat. 3,094,911 corresponding to German Pat. No. 1,211,483.
Figure 2:
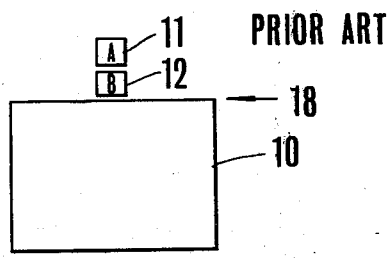
FIG. 2 shows the relation between the image of the focussing screen and the images of the indication bodies formed by means of the device shown in FIG. 1.

Before the explanation of the present invention, an already known finder device for single reflex camera by means of which the images of a plural number of indication bodies of the photographing informations are formed in the neighborhood of the image of the focussing screen will be explained according to FIGS. 1 and 2.

1 is the objective lens. 2 and 3 are, respectively the aperture value setting ring provided on the barrel of the objective lens 1 and the shutter time setting ring. A and B are the figures respectively provided on the aperture value setting ring and on the shutter time setting ring. 4 is the focussing screen. On this focussing screen the image of the object to be photographed is formed by means of the objective lens 1. 5 is the condensor lens. 6 is the pentagonal roof prism. 7 is the subprism cemented on the non reflecting surface of the pentagonal roof prism 6. 8 is the light entry face facing to the light beam emitting face 9 of the pentagonal roof prism 6. Through the face 8, the image 10 of the focussing screen 4 and the images 11, 12 of the figures A and B can be observed. Namely the light beams 13 and 14 coming from the figures A and B, provided, respectively, on the aperture value setting ring 2 and the shutter time setting ring 3, are introduced into the subprism 7 through the eye pieces 15 and 16. These light beams are reflected on the face of the subprism so as to be directed to the faces 8 and 9.

However, as is clear from the paths of the light beams 13 and 14, the direction of the extent of the images 11 and 12 of the figures A and B is not altered. Namely, the figures A and B extend in a direction which is not parallel to one side 17 of the focussing screen 4 of the camera body, or, in the drawing, in a direction which is perpendicular to the one side 17 of the focussing screen 4. Thus the images 11 and 12 of the figures A and B are arranged, as is shown in FIG. 2, to extend in a direction perpendicular to the image 18 of the above mentioned side 17 of the focussing screen 4. Thus the image 11 of the figure A is distant from the center of the image 10 of the focussing screen, so that it is difficult to confirm the photographing informations.

Further, in case a plural number of the indication bodies are provided to extend along the above mentioned direction, a subprism which increases along the vertical direction must be provided, which makes the camera illshaped.

The present invention relates to a finder device for single reflex camera without the above mentioned shortcoming.

Figure 3:
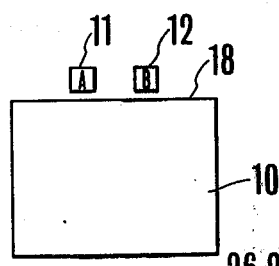
FIG. 3 shows the relation between the image of the screen and the images of the indication formed by means of a preferred embodiment of the present invention.

Namely, by means of the finder device according to the present invention, the images 11 and 12 of the indication bodies, provided to extend in a direction which is not parallel to one side edge 17 of the focussing screen 4 of the camera, assume a direction along the side 18 which is the image of the side 17 of the focussing screen. Thus, both images 11 and 12 are located at positions near the center of the image of the focussing screen so that both of them can be observed very well. Hereby a direction which is not parallel to one side edge 17 of the focussing screen 4 of the camera means only a standard and is not limited only to a direction perpendicular to the side edge 17. The direction can also be an oblique and upward one or a secondary one. In order to convert the positions of the images 11 and 12, shown in FIG. 2, into the one shown in FIG. 3, the height of the light beam 13 and that of the light beam 14 are made the same by means of a light beam deflecting means such as a V-shaped prism and deflected to the right or to the left in a direction perpendicular to the plane of the drawing.

Below the first embodiment of the present invention will be explained with reference to FIGS. 4 to 7.

Figure 4:
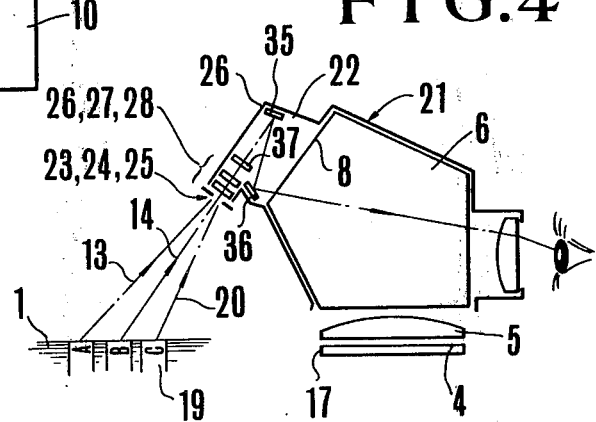
FIGS. 4 to 7 show the first embodiment of the finder device according to the present invention.
Figure 5:
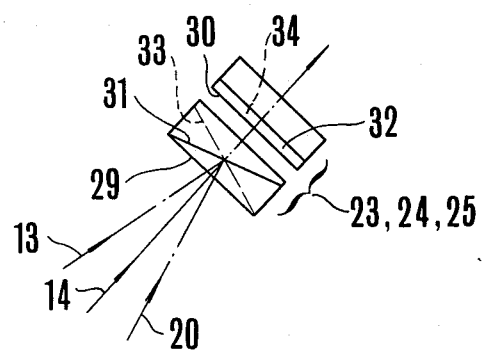
Figure 6:
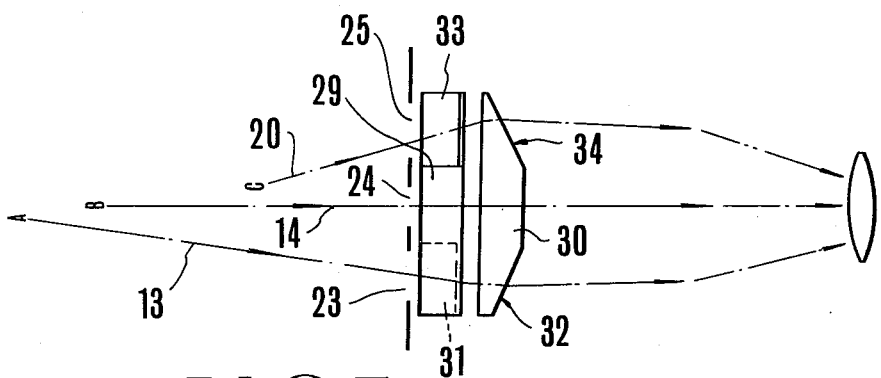
Figure 7:
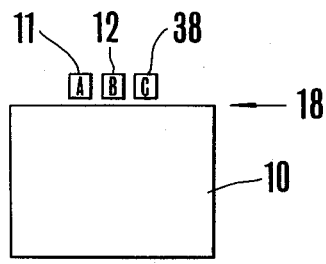

The objective lens shown in FIG. 4 presents a distance scale C provided on the distance setting ring 19. 20 is a path of the light beam coming from the distance scale C. 21 is the cover of the single reflex camera body or the cover of the pentagonal prism part in case this part is one which can be dismounted. The disposition of each member of this single lens reflex camera body and the lens barrel can be thought to be similar to that of the conventional camera such as F-1 of Canon K.K., whereby the appearance of the pentagonal part of a single lens reflex camera presenting the finder device according to the present invention differs from the conventional one in the part facing to the non reflecting surface of the pentagonal prism 6. Namely the part of cover 21 facing to the non reflecting surface of the pentagonal prism 6 is formed with an enclosure 22 as is shown in the drawing. On the part of enclosure 22 facing to the figures A, B and C provided on the above mentioned objective lens 1, three openings 23, 24 and 25 are arranged in a direction perpendicular to the direction of extent of the figures A, B and C. Further with reference to the focussing screen 4 the figures are arranged perpendicularly to the one side edge 17 of the focussing screen 4, while the three openings 23, 24 and 25 are arranged in a direction along or parallel to the side edge 17. The reason why the openings are arranged in a direction along the side edge 17 is to keep the projecting part 26 on the cover 21 as small as possible. The finder optics of the single lens reflex camera is centered with reference to the focussing screen, which is taken hereby as the standard. 26, 27 and 28 are, respectively, the optical means provided for the three openings 23, 24 and 25. At least two of these optical means 26, 27 and 28 in corporate light beam deflecting means. The optical means 26, 27 and 28 will be explained in detail according to FIGS. 5 and 6. To make the explanation brief, the most simple case, in which the light beam 14 coming from the indication body B in the middle passes through the middle opening 24 and is not deflected with regard to other light beams is explained. At the opening 24, a plane parallel glass 29 and another plane parallel glass 30 are disposed. At the opening 23, a prism presenting a slant face 31 and another prism presenting a slant face 32 are disposed. At the opening 25, a prism presenting a slant face 33 other than 31 and another prism presenting a slant face 34 (FIG. 6) other than that 32 are disposed. Thus the light beams 13 and 20 coming from the figures A and C are arranged almost in the same plane by means of the prisms 31 and 33, the light beam 14 coming from the figure B in the middle being at the center in such a manner that all the light beams are directed to the eye piece. Namely the prisms 31 and 33 have such functions as arrange the light beams 13 and 20 along the same direction as that of the light beam 14, as is shown in FIG. 5, while the prisms 32 and 34 have the function to orient the light beams 13 and 20 toward the eye piece 3 along the path of the light beam 14.

Reverting to FIG. 4, the light beams 13, 14 and 20 having passed through the optical means 26, 27 and 28 pass through the non reflecting face 8 of the pentaprism 6 so as to be oriented toward the eye piece in such a manner that the information images 11, 12 and 38 can be observed in the neighborhood of the upper side 18 of the image of the focussing screen. In the above case the prism is devided in two pieces (31 and 32 or 33 and 34) for each information light beam for the sake of brief explanation, whereby it goes without saying that the prism can be constructed as one body. 37 is a lens for enlarging the sight field or for adjusting the visibility, provided in case of necessity.

The present embodiment being constructed as mentioned above, the images 11, 12 and 38 of the figures A, B and C are formed along the image 18 of the above mentioned side edge 17, of the image 10 of the focussing screen 4 as mentioned above. Namely the images, of the indication bodies A, B and C extending in a direction not parallel to or along the one side edge 17 of the focussing screen 4, are formed to extend along the image 18 of the one side edge 17. Thus the images of a plural number of the indication bodies are formed along the image 18 of the side edge 17 so that they can be observed well, while the openings are arranged in the horizontal direction so as to be as close to the optical axis as possible so that the projecting part can be kept as small as possible. In the explanation of the embodiment shown in FIGS. 4-7, prisms with slant face are adopted as light beam deflecting means whereby the light beam deflecting means can be a thin one of the Fresnel type consisting of many fine V-shaped parts or the light beam deflecting means and the lens for adjusting visibility can be combined into one body. Further in, the present embodiment the openings are provided on the part of casing 21 facing to the non reflecting surface of the pentagonal prism, but they can also be provided on other parts of the camera casing to extend in a direction parallel to the part.

Figure 8:
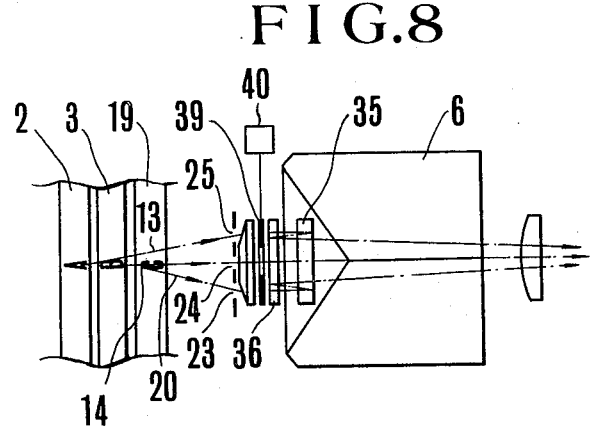
FIG. 8 shows the second embodiment of the present invention.

FIG. 8 shows the second embodiment of the finder device according to the present invention.

In the embodiment of FIG. 8, the prisms 29, 30, 31, 32, 33 and 34 disposed respectively at the openings 23, 24 and 25 are arranged reversely and combined into one body (as one block). 39 is a mask, and 40 the selecting means for selecting the indication by moving the mask 39 from outside of the housing not shown in the drawing.

The first and the second embodiment explained above are intended to observe indication bodies on the lens barrel, but it is also possible to observe other indication bodies provided on the exterior of the camera or on the accessaries mounted on the camera by means of the finder device according to the present invention.

Figure 9:
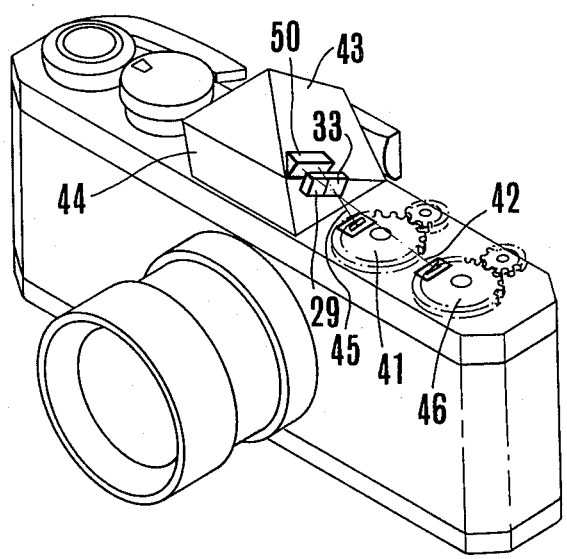
FIGS. 9 to 11 show the third embodiment of the present invention.
Figure 10:
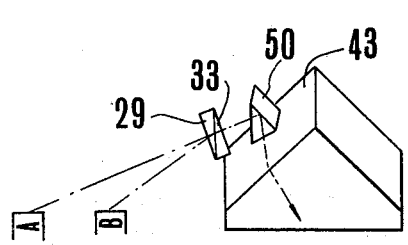
Figure 11:
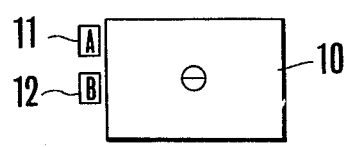

The third embodiment of the present invention, shown in FIGS. 9 to 11, relates to a finder device by means of which it is possible to observe a plural number of indication bodies disposed for example on the top part of the camera body. The third embodiment will be explained below. The figures A and B are provided respectively on the shutter setting dial 46 and the film sensitivity setting dial 41. Figures A and B are provided along a direction perpendicular to a vertical side edge of the focussing screen not shown in the drawing. As is the case with the light beam 14 coming from the figure B in the first embodiment, the light beam 42 coming from the figure A passes through the plane parallel glass plate 29, the prism 50 and the roof face 43 of the pentagonal prism and is reflected by means of the front reflecting face 44 so as to be orientated toward the eye piece, while the light beam 45 coming from the figure B is guided to the same plane as the light beam 42 by means of the light beam deflecting means 33, then passes through the roof face of the pentagonal prism after being reflected inside of the prism 50 and is oriented to the eye piece after being reflected by means of the front reflecting face 44. Thus the images 11 and 12 of the indication bodies are, as is shown in FIG. 11, formed along a vertical side edge of the image of the focussing screen.

While specific embodiments of the invention have been shown and described in detail to illustrate the application of the principles of the invention, it will be understood that the invention may be embodied otherwise without departing from such principles.

What is claimed is:

1. In a single lens reflex camera having an objective lens, a substantially rectangular focussing screen on which the objective lens forms an image of the object, observation optics including an eye piece for viewing an image of the focussing screen, plural photographing information indicating bodies on the exterior of the camera arranged in a row extending in a direction other than parallel to one side edge of the focussing sceen and plural respective photographing information figures provided on each body along such row; a finder device, for providing images of the photographing information in said eye piece adjacent the image of said focussing screen, comprising, in combination, means, including a row of respective light admitting openings, directing light beams from said indicating bodies along respective paths into said observation optics and to said eye piece; and optical means, including a light beam deflecting member, interposed in at least one of said paths to deflect the respective light beam in a direction laterally of the image of said one side edge of said focussing screen and with an orientation towards said eye piece such that the images of the photographing information appear in a row extending substantially parallel to and along the image of said one side edge of said focussing screen.

2. A finder device, as claimed in claim 1 in which said light beam deflecting means is a prism comprising a lens for adjusting the path of the light beam.

3. A finder device, as claimed in claim 1, in which said row of respective light admitting openings extends in a direction intersecting a direction in which said row of photographing information indicating bodies extends.

4. A finder device, as claimed in claim 3, in which said row of photographing information indicating bodies extends perpendicularly to said side of said focussing screen; said row of light admitting openings extending in a direction parallel to the direction in which said row of photographing information indicating bodies extends.

5. A finder device, as claimed in claim 1, in which said photographing information indicating bodies comprise coaxial axially spaced adjusting rings on said objective lens; said observation optics including a pentagonal roof prism having a nonreflecting light entry face and a light admitting face directed toward said eye piece; and a casing enclosing said pentagonal roof prism and formed with an enclosure projecting from said light admitting surface and enclosing said optical means; said light admitting openings being formed in a wall of said enclosure facing said rings.

6. A finder device, as claimed in claim 5, including a mask adjustable in said casing to intercept the light beams from said indicating bodies and having an opening for selecting one light beam; and means for adjusting said mask to select a particular light beam for transmission to said eye piece.

7. A finder device, as claimed in claim 5, in which there are three rings on said objective and three light admitting openings; and respective optical means interposed in the paths of the light beams from only the two outer rings.

8. A finder device, as claimed in claim 1, in which said camera includes a camera body having an upper wall on which said observation optics is mounted and a front wall from which said objective lens projects; said photographic information indicating bodies comprising two adjustable members carrying indicia exposed through respective openings in said upper wall.

* * * * *